United States Patent Office 2,844,436
Patented July 22, 1958

2,844,436

MANUFACTURE OF FINELY-DIVIDED COMPOUNDS OF CERTAIN ELEMENTS

Chester L. Baker, Narberth, and John Frankle Austin, Philadelphia, Pa., assignors to Philadelphia Quartz Company, Philadelphia, Pa., a corporation of Pennsylvania No Drawing. Application November 28, 1952
Serial No. 323,164

16 Claims. (Cl. 23—51)

This invention relates to manufacture of finely-divided compounds of certain elements; and it comprises a process wherein an aqueous colloidal solution of a water-soluble salt of an element selected from a group consisting of zinc, aluminum, beryllium, titanium and phosphorus is treated by adding thereto a coacervating agent in quantity ranging from about 20% to 500% of that required to produce the first appearance of opalescence in the solution when added under equilibrium conditions, this step being accompanied or followed by the addition to the so-activated solution of an insolubilizing agent capable of producing an insoluble compound with the said element; said insolubilizing agent being advantageously added to the activated solution before any coacervated particles have formed which are visible to the naked eye; the time and manner of mixing being controlled to produce particles of the desired size ranging from about 7 milli-microns to about 20 microns in diameter; and then recovering the so-insolubilized particles; all as more fully hereinafter set forth and as claimed.

This application is a continuation-in-part of our copending application, Serial No. 307,574, filed September 2, 1952, and now abandoned, the latter being a continuation-in-part of copending application, Serial No. 763,444, filed July 24, 1947, and now abandoned. In these prior applications we have described methods of obtaining finely-divided solids by treating inorganic colloidal solutions of various compounds with coacervating agents and insolubilizing agents. Both of these prior applications describe in general terms how finely-divided insoluble compounds of amphoteric metals can be produced. In an extended series of tests we have found that the general method of producing such compounds is rather limited in practical application owing to the fact that only a few compounds of the amphoteric metals appear capable of forming colloidal aqueous solutions which are sufficiently concentrated to be capable of being coacervated.

In our practical tests we have so far produced finely-divided compounds of zinc, aluminum, beryllium, titanium and phosphorous. While the latter is not considered to be a metal, it is directly above arsenic—an amphoteric metal—in the periodic table and it lies adjacent silicon—another amphoteric metal; hence it is evidently closely related to amphoteric metals. Our tests show that for a given element to be operative in our process it must form at least one compound with acids or with alkali metals or ammonium which is sufficiently soluble either in monomeric or polymeric form to make a colloidal solution having a minimum viscosity of about 0.5 poise which solution increases rapidly in viscosity upon increase in concentration. The elements enumerated form compounds of this nature.

The present invention relates to a method of making finely-divided compounds of the elements mentioned above having particle sizes varying from those within the upper range of colloidal dimensions, that is from about 0.007 to 1 micron and up to about 20 microns. The method usually produces finely-divided amorphous particles the bulk of which are characterized by their extreme softness. In some cases crystalline particles are produced.

Briefly our method consists in preparing an aqueous colloidal solution of a salt of one of the elements mentioned. The salts which we have used in our tests and the use of which will be illustrated by specific examples are the alkali metal zincates, aluminates, berylliates and polyphosphates, and salts of titanium with mineral acids. To a colloidal solution prepared from a salt of this type there is added a coacervating agent. An agent is also added which is capable of precipitating said element in the form of a water-insoluble compound, this insolubilizing agent being added either simultaneously with or soon after the addition of the coacervating agent. The amount of coacervating agent added and the manner in which the insolubilizing agent is added determines the particle size of the product.

If particles having sizes varying from about 1 to 20 microns are desired, sufficient coacervating agent should be added to cause at least a faint opalescence in the mixture but preferably insufficient to cause coacervated particles which are large enough to be visible to the naked eye before the addition of the insolubilizing agent. If the particles are insolubilized at the point when they first became visible in a dark field microscope or at the first appearance of a faint opalescence in the mixture, their sizes will vary from about 0.1 to 1 micron. And for still finer particle sizes it is necessary to add an insolubilizing agent before the appearance of particles in the dark field microscope. One reason for this is that the insolubilizing agents frequently tend to promote the coacervating actions of the coacervating agents before the particles finally become insolubilized. The ultimate particle size obtainable appears to be about 0.007 micron.

There are two ways in which the particles, or rather the micelles, can be insolubilized before they become visible in the dark field microscope, (1) by the addition of an insolubilizing agent either simultaneously with or immediately after the addition of a slow-acting coacervating agent, or (2) by adding a quantity of coacervating agent which is insufficient to cause the appearance of particles in the dark field microscope and then adding an insolubilizing agent either promptly or after a short lapse of time. If procedure (1) is employed the action of the coacervating agent is stopped by insolubilization before its full effect is realized whereas in procedure (2) the effect of the coacervating agent is completed but the coacervating effect produced is limited by the quantity added.

Some coacervating agents act rapidly and some slowly and the manner in which the reagents should be added to the colloidal solution depends in important degree upon this rate of action. With rapid coacervating agents it is usually more convenient to add less than that required to produce the first appearance of opalescence while with slow acting coacervating agents it is usually more feasible to use an excess of coacervating agent while adding the insolubilizing agent either simultaneously therewith or immediately thereafter and rapidly agitating the mixture to produce complete mixing within a period of less than about 10 seconds. In this way no substantial concentration or temperature changes take place during the actual formation of the insoluble particles. In other words the environmental conditions are maintained substantially constant during the formation of the ultimate particles. This we have found to be highly important in the formation of a product which is free from gel and of uniform particle size.

We have found a rather simple way of testing our finely-divided products for the presence therein of gel material. This is done by subjecting the products to a 325 mesh wet sieve test after grinding under standard conditions. Any residue left on the screen after the test can be considered gel. This is the same test which has been approved as standard for carbon black and is known as ASTM test D–185–45; see American Society for Testing Materials Standards of 1949, part 4, page 163. Products produced by the preferred method of the present invention pass this 325 mesh wet screen test leaving a residue on the screen of less than 0.5% and usually less than 0.1%.

The quantity of coacervating agent to be used in a given case can be estimated by a rather simple test. If the coacervating agent is added slowly in measured quantities to the colloidal solution with a sufficient time interval between additions to permit equilibrium conditions to be substantially reached, a point will be found at which a faint opalescence will become visible. This quantity of coacervating agent can be called 100% for comparative purposes. We have found that it is usually possible to vary the quantity of coacervating agent used in our process from a value of about 30% up to a maximum of 500% expressed in terms of this quantity required to produce the first appearance of opalescence when added under equilibrium conditions. When an excess, i. e. over 100%, is added the time of addition of the insolubilizing agent and the mixing conditions must be carefully controlled. Rapid mixing must be used. The insolubilizing agent can be added simultaneously with the coacervating agent either by the use of two separate streams or a pre-mixture of coacervating agent and insolubilizing agent can be used. It is essential, of course, that the coacervating agent be mixed with the colloidal solution not later than the insolubilizing agent is mixed therewith since, if the insolubilizing agent is mixed in first, no finely-divided particles will be formed but a gelatinous or curdy mass.

The insolubilizing agents which are operative are those which are capable of forming insoluble compounds with the colloidal compounds. The insolubilizing agent should be one which is compatible (non-reactive) with the coacervating agent or at least it should form no compound with the coacervating agent which is less soluble than that formed between the insolubilizing agent and the colloidal compound. If the element, whose finely-divided compound is desired, forms an insoluble oxide or hydroxide it is possible to use as insolubilizing agents soluble acids or acid compounds, in the case of colloidal solutions of alkali metal zincates, aluminates, berylliates or polyphosphates, for example. These insolubilizing agents are added to produce a pH at which maximum insolubility of the oxide or hydroxide is obtained. In the case of colloidal solutions of salts of the elements in question with mineral acids, it is possible to employ alkaline-reacting materials as insolubilizing agents. These are added to produce a pH at which maximum insolubility of the oxides or hydroxides is obtained. It is also possible to use soluble metal compounds as insolubilizing agents which form insoluble compounds when reacted with the colloidal compounds. Thus soluble metal compounds of many metals, such as lead, chromium, copper, iron, calcium etc. form insoluble precipitates when added to aqueous solutions of zincates, berylliates, aluminates and polyphosphates, and therefore can be used as insolubilizing agents. The finely-divided product recovered may be an oxide, hydroxide or a mixed compound such as a mixed or basic salt. Thus, it is possible to produce a precipitate of chromium aluminate or aluminum chromate, for example, depending upon whether the aluminum is present in the original colloidal solution as an aluminate or as an aluminum salt, such as aluminum sulfate, and whether a chromium salt, such as chromic sulfate or potassium chromate is used as insolubilizing agent. Any insolubilizing agent can be employed which, when added to the original colloidal solution, will produce an insoluble precipitate of a compound of the element.

It is possible, of course, to add the insolubilizing agent stepwise, that is, to add a portion at a time filtering off the precipitate after each addition. In this manner products having exceptionally fine particles of relatively uniform size can be obtained. But if one of our preferred mixing steps is utilized such products can be obtained rather easily in one step. Another alternative way of conducting our process is to add sufficient coacervating agent to produce coacervated particles of sufficient size to be filtered off. The filter cake of coacervated particles can then be insolubilized by treating it with an insolubilizing agent. The filtrate obtained after filtering off the coacervated particles is itself a protocoacervate and upon the addition of an insolubilizing agent thereto will produce finely-divided particles which are relatively uniform in size and smaller than those obtained from the filter cake.

A wide range of choice is usually available in any given instance. Sometimes the insolubilizing agent can be produced in situ. If litharge is added to a strongly alkaline protocoacervate of a compound with which lead forms an insoluble precipitate, the lead will go into solution as the plumbite and this will cause the desired precipitate to be formed. In the case of aluminum, for example, the following insolubilizing agents are available; alkaline compounds to form aluminum oxide or hydroxide, soluble ferrocyanide compounds, soluble sulfides, chromates, arsenates, phosphates, silicates, oxalates etc. In the case of zinc a choice can be made of the following insolubilizing agents; alkaline compounds to produce zinc oxide or hydroxide, soluble ferro- and sulfocyanides, sulfides, carbonates, arsenites, arseniates, phosphates, borates, silicates, oxalates, tartrates etc. Any table giving the solubilities of compounds of the polyphosphates and of the elements beryllium and titanium can be used to determine what insoluble compounds of these elements can be formed in finely-divided form in accordance with our process.

With respect to the choice of coacervating agent we have established rather well defined relationships between the various elements or solutions involved in our process which provide assistance in this choice. Thus, we have found that the coacervating agent must be a hydrophilic material which tends to reduce the effective charge on the colloidal particles of the colloidal compound and/or which reduces the effective dielectric constant of the medium between the particles. It must be capable of desolvating the material to be coacervated or of increasing the electrolyte content in the solvate hulls. The coacervating agent need not be an electrolyte since water-soluble or water-miscible hydrophilic organic materials in general are capable of functioning as coacervating agents if added in sufficient quantity. The coacervating agent should not form a precipitate with water and preferably not with a solution of the insolubilizing chemical. Any precipitate formed upon mixing the insolubilizing agent with the coacervating agent must be more soluble than that formed by mixing the insolubilizing agent with the colloidal compound, so that the latter is formed preferentially when the three solutions are mixed.

A large amount of information has accumulated within the past few years concerning the phenomenon known as coacervation. Langmuir, in an article published in J. of Chem. Phys., 6, 873–896 (1938), presents a mathematical formula showing that coacervation occurs when, in a sufficiently dilute solute solution of highly charged plate-like particles, the osmotic pressure reaches a value of $8.9 \times 10^7/B^2$ dynes/cm.$^2$. This coacervation constant is related to the dielectric constant of the solvent, the charge on an electron, etc. B is the distance in centimeters between the platelets. The constant represents a repulsive force which is independent of the charge but does depend on the concentration of the univalent ions. Polyvalent ions decrease the force.

The theoretical expression used by Langmuir, when osmotic pressure is plotted against concentration of colloid, has an S shaped curve like that of the gas laws in the critical region, which indicates that coacervation is a critical phenomenon. In the critical region a maximum of osmotic pressure occurs and in our new process it is evidently necessary to bring the solution to a point just short of this maximum point by the addition of a coacervating agent. The addition of insolubilizing agent then increases the osmotic pressure and ionic strength and decreases the field of force as a consequence of which precipitation occurs.

In his article Langmuir has a table showing the correlation of the concentrations producing coacervation for various materials and with the calculated concentrations.

It seems probable, in view of Langmuir's findings, that the protocoacervate produced in our new process is a dispersion of micelles which are kept separated by ordinary thermal agitation but tend very strongly to form the tactoid groups which Langmuir defines as having the characteristics of a solid material, "often having such low mechanical strength that it appears to flow like a liquid." It appears likely that, when the insolubilizing agent is added to the protocoacervate, this agent reacts with the micelles to produce an insoluble precipitate the particles of which, on account of the speed of the insolubilizing reaction, retain to at least some extent the structure of the original micelles, very little agglomeration taking place. A precipitate is produced in this manner which, surprisingly, is totally different from that which would be produced if the insolubilizing agent should be added directly to the solution without any prior addition of coacervating agent.

Verwey and Overbeck in their book the "Theory of the Stability of Lyophobic Colloids," New York, Elsevier Publishing Co., 1948, have also discussed the principles of coacervation at some length. For the region of very small particles they are in substantial agreement with Langmuir, although there are some basic differences in their theoretical approaches.

Among the coacervating agents which have been successfully used in our new process there may be mentioned methyl and ethyl alcohols, acetone, ethylene glycol, monoethanol amine, the ethyl ether of ethylene glycol, formaldehyde, uni-univalent electrolytes such as NaCl, $NH_4OH$, KCl, and $NaNO_2$ and the more highly soluble uni-divalent electrolytes such as $Na_2SO_4$ and sodium tartrate.

The quantity of insolubilizing agent employed should be sufficient to precipitate at least a substantial portion of the colloidal compound; otherwise the process is not economical. A simple way of testing whether sufficient insolubilizing agent has been added is to filter off the precipitate and then to add more insolubilizing agent to the filtrate. If a secondary precipitate is formed in the filtrate this shows that precipitation was originally incomplete.

As described more completely in our copending application, Serial No. 292,936, filed June 11, 1952, it is possible to obtain finely-divided products having a particle size somewhat below 1 micron by mixing a coacervating agent with a colloidal solution in a beaker, for example, and subsequently adding the insolubilizing agent while stirring. If this mixing technique is used the insolubilizing agent is preferably added rapidly and must be thoroughly mixed in before the appearance of substantially any irreversible precipitate in the mixture. Otherwise the product will contain considerable amounts of gel. The maximum amount of coacervating agent to be used is that which will produce coacervated particles which are visible to the naked eye before mixing in of the insolubilizing agent. The minimum amount of coacervating agent which can be used is roughly about 20 to 50% of that required to produce the first appearance of opalescence when added under equilibrium conditions. The particle size can be controlled by the amount of coacervating agent added as mentioned previously. Other factors being equal the less the amount of coacervating agent employed the finer the particles in the resulting product.

In general the more efficient and the more rapid the mixing the finer the particles produced. Several continuous mixing techniques are available wherein converging streams or jets of the reactants are employed followed by continuously filtering off the precipitate formed. For example the colloidal solution can be continuously mixed in a Y tube with the coacervating agent and this mixture impelled in a jet to be mixed with a jet of the insolubilizing agent. It is also usually possible to mix the coacervating agent with the insolubilizing agent in a Y tube followed by mixing the resulting mixture in the form of a jet with a jet of the colloidal solution. In this latter method it is evident that the coacervating agent and the insolubilizing agent are mixed with the colloidal solution simultaneously and in a predetermined ratio. If the coacervating agent is slow-acting it is possible substantially to increase the proportion of this agent in the mixture since the insolubilizing agent effectively stops the coacervating action before it becomes more than partially effective. In the case of some reactants it is possible to use up to 500% of the quantity of coacervating agent capable of producing the first appearance of opalescence under equilibrium conditions. Substantially the same results are obtained if the reactants are mixed in three jets.

In all of the mixing techniques mentioned it is evident that during the formation of the ultimate particles the environmental conditions of concentration, temperature, pH and the like are maintained substantially constant. And, as mentioned previously, this is important in obtaining products of the finest particle sizes free from gel. In contrast, if mixing is accomplished by adding the coacervating agent to a beaker containing the colloidal solution and the insolubilizing agent is then added slowly under agitating conditions over a period of say from 1 to 20 minutes, the resulting product will contain a substantial proportion of gel and the non-gel portion will consist of particles of widely different sizes. Under these conditions of mixing it is evident that the environmental conditions of concentration, pH, temperature etc. vary substantially from the beginning to the end of the mixing.

The mixing of streams or jets of the reactants in the ways described can, of course, be conducted on a commercial scale, the mixtures produced being passed to a continuous filter of the rotary drum type or being filtered on a moving filter belt, for example. The jet mixing techniques are capable of producing products whose average particle size is less than 20 mu down to a minimum of about 7 mu and containing less than 0.1% gel.

Our invention can be described in greater detail by reference to the following specific examples which represent practical operating embodiments of our invention.

*Example 1*

100 pounds of $Al_2O_3$ was dissolved in a solution of 150 pounds of NaOH in 900 pounds of water. A protocoacervate was formed by adding 164 pounds of methanol. 70 pounds of sulfuric acid solution (1.4 sp. gravity) were then quickly mixed in as an insolubilizing agent. The finely-divided precipitate of $Al_2O_3$ was filtered off, washed and dried. 100 pounds were recovered and it was found that the average particle size was 1.5 microns.

*Example 2*

50 parts by volume of a solution of NaOH saturated with $Zn(OH)_2(Na_2ZnO_2)$ formed a protocoacervate when mixed with 30 parts of $CH_3OH$. To this was added 50 parts of GR-S latex (type 3, total solids 38.12%, Naugatuck Chemical Co.) and an intimate mixture of ZnO and rubber crumb was formed by adding 5 parts of concentrated HCl as an insolubilizing agent. The ZnO particles were 0.1 to 0.5 micron in diameter. If no protocoacervate was formed, the ZnO particles were 5 or 10 microns in diameter.

*Example 3*

Zinc oxide was dissolved in caustic soda to make a final composition containing 27.2% $Na_2O$ and 6.65% ZnO and having a specific gravity of 1.57. This solution was diluted with water 1 to 1. Methyl alcohol was then added to a portion of this solution very slowly with stirring until the first appearance of a faint opalescence. It was found that 99.5 mm. of methyl alcohol were required to 100 ml. of the zincate. This gives a ratio of 99.5/100 which can be called an "opalescence ratio" of 100%. It was decided to employ an "opalescence ratio" of 95% in the following test; hence methyl alcohol was added to another beaker containing the diluted zincate in the ratio of 95% of 99.5 or 94.5 ml. per 100 ml. of the zincate solution. Obviously this was just short of the quantity required to produce the first appearance of opalescence. To the protocoacervate thus formed concentrated HCl was added in an amount stoichiometrically equivalent to the $Na_2O$, i. e. 59 ml. per 100 ml. of zincate. A finely-divided precipitate immediately formed and this was filtered off and dried. Microscopic examination showed this to consist of uniform spherical particles about 1 micron in size with many small clusters present. The 325 mesh wet sieve test showed 0% residue indicating that the product was entirely free from gel material. A determination was made of the particle size by the method described by Pechukas and Gage, Ind. Eng. Chem., Analytical Edition, 18, 370 (1946), assuming that the density of the particles was 5.4. A particle size of 0.033 micron (33 mu) was obtained.

Another test was conducted in exactly the same manner down to the point of forming the protocoacervate. At this point a mass of paper fibers was dispersed through the liquid and this was followed by the addition of the same amount of HCl. Microscopic examination showed particles having about the same size (1 micron) covering the paper fibers uniformly and apparently attached or bound to these fibers. In a comparative test made in the same way except that no alcohol (coacervating agent) was added to the zincate solution, it was found that the paper fibers had large areas entirely free from particles and, in the case of the relatively few particles attached to the fibers, it was evident from examination that the adherence between fibers and particles was poor. The results of this and other tests indicate that the intermediate formation of a protocoacervate causes the particles formed to adhere to any finely-divided inert material which may be present during the insolubilization reaction.

*Example 4*

In another test a solution of sodium zincate was formed as described in Example 3, containing 27.2% $Na_2O$ and 6.65% ZnO. This was formed into a protocoacervate by the addition of saturated brine (30 g. NaCl per 100 ml.) in the amount of 44 ml. per 100 ml. of zincate solution. It had been determined previously that this quantity of brine was just sufficient to produce the first appearance of opalescence. In other words an "opalescence ratio" of 100% was employed. To the so-formed protocoacervate 118 ml. of concentrated HCl per 100 ml. of the zincate solution were quickly added with stirring, this being stoichiometrically equivalent to the $Na_2O$ present. An immediate precipitate was obtained. Microscopic examination of the dried product showed that the precipitated particles were uniform in size, spherical, with apparent diameters of approximately 1 micron and with small clusters present.

*Example 5*

A solution of sodium aluminate was prepared by dissolving enough $Al_2O_3$ in a caustic soda solution to contain 0.1312 g. $Al_2O_3$ and 0.1318 g. $Na_2O$ per ml. It was found that 1.1 ml. of methyl alcohol was required to produce the first appearance of opalescence in 1 ml. of the aluminate. It was decided to use an opalescence ratio of 90%; hence a protocoacervate was formed by adding 39.6 ml. of alcohol to 40 ml. of the aluminate solution in a beaker equipped with a stirrer. No opalescence developed but with 200 ml. of a sodium silicate solution (containing 2.2% $Na_2O$ and 7.2% $SiO_2$) a voluminous precipitate formed. The silicate was added in amount sufficient to produce a mole ratio of $5SiO_2$ to $1Al_2O_3$. The precipitate was found upon microscopic examination to contain roughly spherical particles having an apparent size of about 1 micron with many small clusters present. The Pechukas and Gage method showed that the average particle size was 30 mu.

In a comparative test the same procedure was employed except that no alcohol was added to the sodium aluminate solution. In other words the sodium silicate solution was added directly to the sodium aluminate solution. In this case the particles formed when examined under the microscope were found to be non-uniform and angular in shape having apparent diameters of about 4 to 16 microns. The 325 mesh wet sieve test showed a residue of 81% by weight, assumed to be gel material. The Pechukas and Gage method gave a particle size of 52 mu but, since this method is known to give low values in the case of particles containing gel, this figure is doubtless in error.

*Example 6*

In this experiment of special mixing equipment was employed, this consisting of a Y tube having branches ¾ inch long and 1.5 mm. diameter, the tail or discharge leg of the Y being connected by a 6 inch rubber tube, having a slightly larger diameter, to one branch of a second Y tube identical to the first. A solution of sodium aluminate containing 0.1312 g. $Al_2O_3$ and 0.1318 g. $Na_2O$ per ml. was passed into one branch of the first Y tube at a rate of 22 ml. per minute. Methyl alcohol was passed through another branch of the first Y at a rate of 21.8 ml. per minute. These two solutions were mixed at the mid-point of the Y and the mixture passed through the tail of the first Y, through the rubber tube into a branch of the second Y tube. A sodium silicate solution containing 2.2% $Na_2O$ and 7.2% of $SiO_2$ was passed into another branch of the second Y tube at a rate of 110 ml. per minute. The final mixture discharging from the tail of the second Y fell into a beaker equipped with a stirrer. The precipitate formed in the beaker was filtered off and dried. Examination under a microscope showed somewhat angular particles having an apparent size ranging from 4 to 12 microns. The wet sieve test produced no residue, showing that the product was free from gel material. The Pechukas and Gage method gave an average particle size of 66 mu.

A second test was conducted under the same conditions but with a flow rate which was double that used in the first test. The results of this test were substantially the same as the first except that the particles were spherical rather than angular and the Pechukas and Gage method gave an average particle size of 60 mu.

A third test was conducted with conditions identical to those used in the second test except that no alcohol was used. The product obtained examined under the microscope showed particles very similar to those obtained in the second test but in the wet sieve test a residue of 0.3% was obtained and the Pechukas and Gage test gave apparent particle size of 110.

Example 7

In this test 50 g. of sodium hexametaphosphate $(NaPO_3)_6$ were dissolved in 150 ml. of water. This solution was found to require the addition of 50.2 ml. of concentrated $NH_4OH$ to produce the first appearance of opalescence. To this mixture 284 ml. of a solution containing 0.2875 g. $CaCl_2$ per ml. were added. The $CaCl_2$ added was sufficient to precipitate all of the phosphate as $Ca_3(PO_4)_2$. The precipitate formed was filtered off, dried and examined under the microscope. The particles appeared roughly spherical and had apparent diameters of about 1 micron, small clusters being present. The wet sieve test produced no residue and the Pechukas and Gage test indicated an average particle size of 77 mu.

In a repetition of this test in which the addition of ammonia was omitted, microscopic examination of the product showed particles having diameters of 2 microns which were angular rather than spherical. The Pechukas and Gage method gave an average particle size of 147 mu.

Example 8

Beryllium hydroxide was precipitated from a solution of beryllium nitrate by adding ammonium hydroxide. The precipitate was filtered off, washed and dissolved in 50% caustic soda solution to produce a solution of sodium berylliate containing 11 g. BeO per 100 ml. This solution required 40 ml. concentrated HCl to neutralize 100 ml. The solution of sodium berylliate was divided into two parts, these being tested separately. The first part was neutralized by adding concentrated HCl and the resulting prepicitate of BeO recovered. The second part was converted into a protocoacervate by the addition of 18 ml. of methyl alcohol per 100 ml. and then precipitated by neutralization with concentrated HCl, the precipitate being recovered. The methyl alcohol and HCl were added simultaneously with strong stirring. The methyl alcohol added in the second test amounted to 90% of the quantity required to produce the first appearance of opalescene, i. e. the opalescene ratio was 90%. The first precipitate gave a product having a particle size of 27 mu as determined by the Pechukas and Gage method and gave a wet sieve residue of 3%. The particles in the second precipitate were uniform in size while those of the first precipitate were irregular in size. The recovery of beryllium oxide in the second test was about 50% greater than that in the first test. It is therefore evident that a considerable advantage was gained by the use of a coacervating agent in the second test in accordance with our invention.

Example 9

Titanium dioxide and sodium carbonate were fused together and after cooling freed from alkali by washing. The residue was then dissolved in concentrated HCl. The resulting titanium chloride solution contained 22 g. of $TiO_2$ per 100 mls. It was found that 75 ml. of concentrated $NH_4OH$ solution were needed to neutralize 100 ml. of the titanium chloride solution. The titanium chloride solution was divided into two parts. The first part was neutralized by adding concentrated ammonia solution with stirring and the resulting precipitate recovered. The second part was treated by adding 100 ml. of methyl alcohol, as coacervating agent, and 75 ml. of concentrated ammonia solution per 100 ml. of solution, the methyl alcohol and ammonia being added simultaneously with rapid stirring. The quantity of methyl alcohol added was about 50% of that required to produce the first appearance of opalescence. The precipitates obtained in the two tests were compared. The first precipitate had an average particle size determined by the Pechukas and Gage method of 30 microns, assuming a density of 4.0, while the second had an average particle size of 5 microns determined in the same fashion. The first precipitate had a wet sieve residue of 100% while the second had a corresponding residue of 35%. The particles in the second product were much more regular and uniform in size. It was also noted that the second product was much softer than the first. In the second test the recovery was about 75% greater than in the first test.

The products of this invention are useful in a large number of industrial applications, in fact they are useful wherever finely-divided products can be used. Probably the most universal uses for these products is as fillers for plastics and resins of all types and extenders for fertilizers, insecticides etc. The products which are colored can be used as pigments in paints, inks etc. Our $Al_2O_3$ product is adapted to fine polishing procedures by reason of its fineness, softness and spherical shape. The zinc oxide and zinc silicate products can be used as reinforcing agents in the compounding of rubber. Our products can be produced at a cost which is usually considerably below that of other processes now used for producing products of a comparable particle size. In addition our products have the advantage that they can be readily washed free from extraneous matter owing to their excellent filtering properties. They can be obtained in a highly pure condition. For this reason they can be used as excipients in pharmaceutical preparations and the like. Many other uses for these products will occur to those skilled in the art.

Our process lends itself to the production of filled products of various types. Water soluble resins, for example, can be filled by forming one of our protocoacervates in the presence of a dissolved resin followed by precipitating the resin and the finely-divided colloidal compound simultaneously by mixing in a mutual insolubilizing compound. Thus sodium rosinate can be dissolved in alkaline protocoacervates containing sodium zincate or sodium aluminate, for example and coprecipitation produced with an acid insolubilizing agent. Polyvinyl alcohol can also be filled in this manner. If one of our precipitates is formed in the presence of a finely-divided material, such as paper pulp, asbestos fibers or other fibrous material in suspension, the finely-divided precipitate is formed in and on the fibers and the latter become thoroughly impregnated.

While we have described what we consider to be the most advantageous embodiments of our process it is evident, of course, that various modifications can be made in the specific procedures which have been described without departing from the purview of this invention. It is believed obvious from the above description that our process is capable of producing colloidal-sized particles of a large number of compounds of zinc, aluminum, beryllium, titanium and phosphorus in the form of their oxides, hydroxides, basic salts or complex salts and wherein the element may occur either in the cation or the anion or in both, by precipitation from aqueous colloidal solutions. Owing to the number of possible compounds involved and of the modifications of procedure which may be followed, it is impossible to set out any specific ranges of concentrations, temperatures and the like which are applicable to all cases. Neither is it possible to set out a single specific procedure which would be applicable to the preparation of all of the various possible finely-divided products. However we believe that the foregoing specific examples, coupled with the description of the general principles involved in our invention, will enable those skilled in the art to produce the finely-divided products falling within the scope of this invention. Many of the coacervating and insolubilizing agents which have been mentioned can be used as equivalents in the production of our products. A large number of mixing procedures are available which conform to the principles set out. As pointed out previously, in general the more rapid the mixing the more finely-divided the products produced. Mixing can be accomplished in conventional mixing tanks by introducing the reactants simultaneously through two or more pipes, if desired, in order to maintain the environmental conditions relatively constant during formation of the precipitate. Conventional ways of separating the precipitate can be used but it is usually advisable to separate the product promptly after it is formed since there may be a tendency for the particles to agglomerate if they are kept in suspension too long. Further modifications of our process which fall within the scope of the following claims will be immediately evident to those skilled in the art.

What we claim is:

1. In the manufacture of finely-divided products, the process which consists essentially in dissolving in water a water-soluble salt selected from a class consisting of the alkali metal zincates, aluminates, berylliates and polyphosphates, in amount sufficient to produce a solution capable of being coacervated with a viscosity of at least about 0.5 poise, mixing with the resulting colloidal solution a coacervating agent in amount tending to produce coacervation, then mixing in within a period of less than 10 seconds and before the appearance of more than a faint haze in the solution an aqueous solution of an insolubilizing agent capable of precipitating an insoluble compound when reacted with said salt; said insolubilizing agent being added in such manner that no substantial concentration or temperature changes take place during the actual formation of the insoluble particles; and recovering the resulting finely-divided particles substantially free from gel.

2. In the manufacture of finely-divided products, the process which consists essentially in preparing an aqueous colloidal solution, sufficiently concentrated to be coacervated and having a viscosity of at least about 0.5 poise, by dissolving in water a water-soluble salt, selected from the class consisting of the alkali metal zincates, aluminates, berylliates and polyphosphates, mixing with said colloidal solution a coacervating agent in amount varying from about 20 to 500% of the quantity which is required, when added sufficiently slowly to permit equilibrium conditions substantially to be established, to cause the first appearance of a faint opalescence, also adding prior to the formation of any coacervated particles visible to the naked eye, an insolubilizing agent capable of forming an insoluble compound when reacted with said water-soluble salt; said insolubilizing agent being added under conditions of agitation in such manner that mixing is completed within a period of less than about 10 seconds and so that no substantial concentration or temperature changes take place during the resulting formation of the insoluble particles; and recovering the resulting finely-divided particles substantially free from gel.

3. The process of claim 2 wherein the insolubilizing agent is an acid and the product recovered is an oxide.

4. The process of claim 2 wherein the coacervating agent is a water-miscible organic compound.

5. The process of claim 2 wherein the coacervating agent is a concentrated aqueous solution of a salt which is non-reactive with the compound in said colloidal solution and with the insolubilizing agent.

6. The process of claim 2 wherein the coacervating agent is methyl alcohol.

7. The process of claim 2 wherein the coacervating agent is sodium chloride.

8. The process of claim 2 wherein the coacervating agent and the insolubilizing agent are mixed simultaneously with the colloidal solution.

9. The process of claim 2 wherein the coacervating agent is added first to the colloidal solution and the insolubilizing agent is then mixed in before the appearance of coacervated particles sufficiently large to be visible to the naked eye.

10. The process of claim 2 wherein the colloidal solution is a solution of sodium zincate.

11. The process of claim 2 wherein the colloidal solution is a solution of sodium aluminate.

12. The process of claim 2 wherein the colloidal solution is a solution of sodium berylliate.

13. The process of claim 2 wherein the colloidal solution is a solution of sodium polyphosphate.

14. The process of claim 2 wherein a finely-divided inert material is present in the mixture when the insolubilizing agent is mixed in, whereby a precipitate is formed which adheres to the inert material.

15. The process of claim 2 wherein sodium silicate is used as the insolubilizing agent.

16. The process of claim 2 wherein flowing streams of the colloidal solution, the coacervating agent and the insolubilizing agents are mixed together.

References Cited in the file of this patent

UNITED STATES PATENTS

| | | |
|---|---|---|
| 1,642,880 | Kriegsheim et al. | Sept. 20, 1927 |
| 1,674,558 | Miller | June 19, 1928 |
| 1,756,625 | Behrman | Apr. 29, 1930 |
| 1,795,361 | Coffelt | Mar. 10, 1931 |
| 1,879,071 | Busch | Sept. 27, 1932 |
| 1,929,452 | Sebastian | Oct. 10, 1933 |
| 1,971,319 | Wildman | Aug. 21, 1934 |
| 2,210,650 | Behrman | Aug. 6, 1940 |
| 2,213,530 | Montero | Sept. 3, 1940 |
| 2,258,099 | Patrick | Oct. 7, 1941 |
| 2,277,854 | Lecoq | Mar. 31, 1942 |
| 2,344,553 | Loth | Mar. 21, 1944 |
| 2,386,337 | Moyer | Oct. 9, 1945 |
| 2,413,184 | LeLande | Dec. 24, 1946 |
| 2,434,418 | La Lande | Jan. 13, 1948 |
| 2,438,560 | Kanofer | Mar. 30, 1948 |
| 2,469,379 | Fraser | May 10, 1949 |
| 2,471,000 | Messenger | May 24, 1949 |
| 2,485,287 | Henson et al. | Oct. 8, 1949 |
| 2,498,353 | Bierce | Feb. 21, 1950 |

FOREIGN PATENTS

| | | |
|---|---|---|
| 352,681 | Great Britain | July 16, 1931 |
| 391,322 | Great Britain | Apr. 27, 1933 |
| 561,750 | Great Britain | June 2, 1944 |

OTHER REFERENCES

Mellor: A Comprehensive Treatise on Inorganic and Theoretical Chemistry, vol. 4, 527 (1923), and vol. 5, 289 (1924), vol. 6, 323 (1925), Longmans, Green & Co., London.